US012020011B2

(12) United States Patent
Ambre et al.

(10) Patent No.: US 12,020,011 B2
(45) Date of Patent: Jun. 25, 2024

(54) MANAGING AN UPGRADE OF A VIRTUALIZATION INFRASTRUCTURE COMPONENT

(71) Applicant: VMware LLC, Palo Alto, CA (US)

(72) Inventors: Swapneel Ambre, Milpitas, CA (US); Sudipto Mukhopadhyay, Pleasanton, CA (US)

(73) Assignee: VMware LLC, Palo Alto, CA (US)

( * ) Notice: Subject to any disclaimer, the term of this patent is extended or adjusted under 35 U.S.C. 154(b) by 254 days.

(21) Appl. No.: 16/116,595

(22) Filed: Aug. 29, 2018

(65) Prior Publication Data

US 2020/0073648 A1 Mar. 5, 2020

(51) Int. Cl.
*G06F 8/65* (2018.01)
*G06F 8/71* (2018.01)
*G06F 9/455* (2018.01)
*G06F 16/901* (2019.01)
*G06F 16/907* (2019.01)
*H04L 67/00* (2022.01)

(52) U.S. Cl.
CPC .......... *G06F 8/65* (2013.01); *G06F 8/71* (2013.01); *G06F 9/45558* (2013.01); *G06F 16/9024* (2019.01); *G06F 16/907* (2019.01); *H04L 67/34* (2013.01)

(58) Field of Classification Search
CPC .... G06F 8/65; G06F 8/60–71; G06F 8/73–74; G06F 9/45558; G06F 16/9024; G06F 16/907; H04L 67/34

USPC .................................................. 717/168–178
See application file for complete search history.

(56) References Cited

U.S. PATENT DOCUMENTS

| | | | |
|---|---|---|---|
| 9,047,160 B2 * | 6/2015 | Adi | G06F 8/63 |
| 9,389,847 B2 * | 7/2016 | Cameron | G06F 8/65 |
| 9,535,684 B2 * | 1/2017 | Hiltgen | G06F 8/60 |
| 10,089,108 B1 * | 10/2018 | Noble | G06F 8/65 |
| 2005/0132350 A1 * | 6/2005 | Markley | G06F 8/65 717/168 |
| 2006/0101457 A1 * | 5/2006 | Zweifel | G06F 8/65 717/174 |
| 2006/0112152 A1 * | 5/2006 | Napier | G06F 8/658 |

(Continued)

*Primary Examiner* — Andrew M. Lyons
(74) *Attorney, Agent, or Firm* — Quarles & Brady LLP

(57) ABSTRACT

In a method for managing an upgrade of a virtualization infrastructure component, a plurality of metadata manifests corresponding to a plurality of software upgrade bundles is received, a software upgrade bundle for upgrading a virtualization infrastructure component from a source version to a target version, a metadata manifest comprising a listing of applications comprised within a corresponding software upgrade bundle and installation instructions for the applications comprised within the corresponding software upgrade bundle for upgrading the virtualization infrastructure component from a particular source version to a particular target version. A directed acyclic graph of available upgrade paths for the virtualization infrastructure component is populated based on the plurality of metadata manifests, wherein nodes identify the source versions and the target versions and edges identify the software upgrade bundle for upgrading the virtualization infrastructure component from the particular source version to the particular target version identified by the corresponding software upgrade bundle.

19 Claims, 9 Drawing Sheets

(56) References Cited

U.S. PATENT DOCUMENTS

| | | | |
|---|---|---|---|
| 2006/0136904 A1* | 6/2006 | Weidman | G06F 8/71 717/172 |
| 2006/0161563 A1* | 7/2006 | Besbris | G06F 9/445 |
| 2006/0168572 A1* | 7/2006 | Backlund | G06F 8/65 717/137 |
| 2007/0006222 A1* | 1/2007 | Maier | G06F 8/61 717/174 |
| 2007/0113225 A1* | 5/2007 | Felts | G06F 8/65 717/172 |
| 2007/0234343 A1* | 10/2007 | Gouge | G06F 21/51 717/174 |
| 2008/0301668 A1* | 12/2008 | Zachmann | G06F 8/656 717/173 |
| 2010/0083230 A1* | 4/2010 | Ramakrishnan | G06F 8/71 717/121 |
| 2011/0239189 A1* | 9/2011 | Attalla | G06F 8/65 717/121 |
| 2012/0084752 A1* | 4/2012 | Arnold | G06F 8/63 717/121 |
| 2012/0272228 A1* | 10/2012 | Marndi | G06F 8/65 717/170 |
| 2013/0086015 A1* | 4/2013 | van Rotterdam | G06F 16/2365 707/695 |
| 2013/0254757 A1* | 9/2013 | Yousouf | G06F 8/61 717/174 |
| 2013/0283252 A1* | 10/2013 | Mannarswamy | G06F 8/656 717/168 |
| 2013/0346945 A1* | 12/2013 | Yousouf | G06F 8/36 717/121 |
| 2014/0013318 A1* | 1/2014 | Rychikhin | G06F 8/65 717/172 |
| 2014/0201727 A1* | 7/2014 | Asselin | G06F 8/654 717/170 |
| 2014/0344799 A1* | 11/2014 | Thodati | G06F 8/654 717/171 |
| 2015/0074644 A1* | 3/2015 | Oberheide | G06F 16/2455 717/122 |
| 2015/0227363 A1* | 8/2015 | Pillgram-Larsen | G06F 11/3664 717/122 |
| 2015/0347124 A1* | 12/2015 | Sotani | G06F 8/654 717/170 |
| 2015/0378712 A1* | 12/2015 | Cameron | G06F 3/04842 717/169 |
| 2016/0004520 A1* | 1/2016 | Gourmelen | G06F 8/60 717/120 |
| 2016/0094502 A1* | 3/2016 | Pollack | H04L 51/12 726/4 |
| 2016/0162275 A1* | 6/2016 | Morley | G06F 8/65 717/170 |
| 2016/0274898 A1* | 9/2016 | Rychikhin | G06F 8/65 |
| 2017/0242688 A1* | 8/2017 | Yu | H04L 67/12 |
| 2017/0357496 A1* | 12/2017 | Smith | H04L 9/3228 |
| 2017/0371650 A1* | 12/2017 | Li | G06F 8/73 |
| 2018/0024850 A1* | 1/2018 | Caro Estevez | G06F 16/51 718/1 |
| 2018/0074819 A1* | 3/2018 | St. John | G06F 8/433 |

* cited by examiner

FIG. 7A
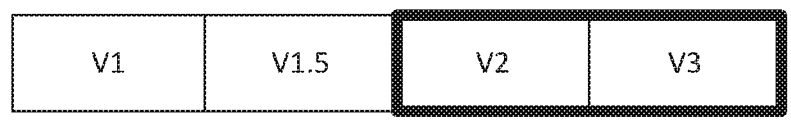
FIG. 7B

MANAGING AN UPGRADE OF A VIRTUALIZATION INFRASTRUCTURE COMPONENT

BACKGROUND

In conventional virtual computing environments, life cycle management of components, e.g., management Points of Delivery (PODs) and workload PODS, may be complex and cumbersome. Compatibility between a management component and workload components is essential for the operation of the computing environments. Furthermore, applications executing within the virtual computing environment often require updating to ensure performance and functionality. Management of updates may also be difficult due to the distributed nature of conventional virtual computing environments

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

FIGS. 7A and 7B depict examples of compatibility windows for a management component, in accordance with embodiments.

DETAILED DESCRIPTION OF CERTAIN EMBODIMENTS

Figure 1:
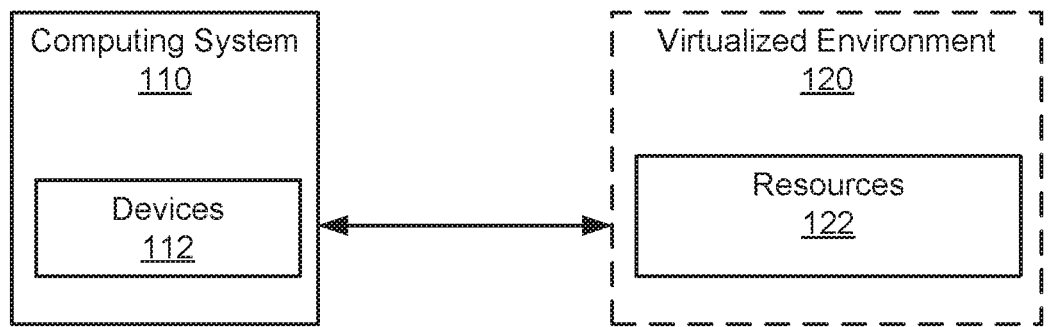
FIG. 1 depicts a block diagram of a virtual computing environment, according to various embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "receiving," "generating," "populating," "updating," "utilizing," "determining," "maintaining," "applying," or the like, refer to the actions and processes of an electronic computing device or system such as: a host processor, a processor, a memory, a hyper-converged appliance, a software defined network (SDN) manager, a system manager, a virtualization management server or a virtual machine (VM), among others, of a virtualization infrastructure or a computer system of a distributed computing system, or the like, or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions residing on some form of non-transitory computer-readable storage medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

In one embodiment, a method for managing an upgrade of a virtualization infrastructure component is provided. A metadata manifest corresponding to a software upgrade bundle is received, where a software upgrade bundle is for upgrading a virtualization infrastructure component from a source version to a target version. A metadata manifest includes a listing of applications included within a corresponding software upgrade bundle and installation instructions for the applications included within the corresponding software upgrade bundle for upgrading the virtualization infrastructure component from a particular source version to a particular target version. A directed acyclic graph of available upgrade paths for the virtualization infrastructure component is populated based on the metadata manifest. Nodes of the directed acyclic graph identify the source versions and the target versions and edges of the directed acyclic graph identify the software upgrade bundle for upgrading the virtualization infrastructure component from the particular source version to the particular target version identified by the corresponding software upgrade bundle. As new metadata manifest corresponding to new software upgrade bundle is received, the directed acyclic graph is updated.

In one embodiment, responsive to a request to upgrade the virtualization infrastructure component to a requested target version, the directed acyclic graph is utilized to determine at least one upgrade path identifying at least one software upgrade bundle of the plurality of software upgrade bundles for upgrading the virtualization infrastructure component to the requested target version. In one embodiment, at least one software upgrade bundle of the plurality of software upgrade bundles corresponding to the selected upgrade path is received. In one embodiment, the virtualization infrastructure component is upgraded to the requested target version using the at least one software upgrade bundle of a selected upgrade path. In one embodiment, the selected upgrade path is an upgrade path selected from a plurality of upgrade paths including a fewest amount of software upgrade bundles.

In another embodiment, a method for maintaining compatibility between virtualization infrastructure components is provided. A compatibility window defining at least one version of a virtualization infrastructure component of a virtualization infrastructure that is compatible with a management virtualization infrastructure component of the virtualization infrastructure is maintained. Responsive to determining that the current version of the virtualization infrastructure component is not within the compatibility window, a directed acyclic graph of available upgrade paths for the virtualization infrastructure component is utilized to determine at least one upgrade path identifying at least one software upgrade bundle for upgrading the virtualization infrastructure component to a version within the compatibility window. In one embodiment, at least one software upgrade bundle of the plurality of software upgrade bundles corresponding to the selected upgrade path is received. In one embodiment, the virtualization infrastructure component is upgraded to the requested target version using the at least one software upgrade bundle of a selected upgrade path.

Embodiments of a Virtual Computing Environment

FIG. 1 depicts a block diagram that illustrates virtual computing environment (VCE) 100 (or virtualization infrastructure) that includes computing system 110 and virtualized environment 120, according to various embodiments. In general, computing system 110 and virtualized environment 120 are communicatively coupled over a network such that computing system 110 may access functionality of virtualized environment 120.

As will be described in further detail below, computing system 110 is implemented using virtualized environment 120. Also, while implementing the business functionality, computing system 110 might use some of resources 122.

In one embodiment, computing system 110 may be a system (e.g., enterprise system) or network that includes a combination of computer hardware and software. The corporation or enterprise utilizes the combination of hardware and software to organize and run its operations. To do this, system 110 uses resources 122 because system 110 typically does not have dedicated resources that can be given to the virtualized environment. For example, an enterprise system may provide various computing resource for various needs such as, but not limited to information technology (IT), security, email, etc.

In various embodiments, computing system 110 includes a plurality of devices 112. The devices are any number of physical and/or virtual machines. For example, in one embodiment, computing system 110 is a corporate computing environment that includes tens of thousands of physical and/or virtual machines. It is understood that a virtual machine is implemented in virtualized environment 120 that includes one or some combination of physical computing machines. Virtualized environment 120 provides resources 122, such as storage, memory, servers, CPUs, network switches, etc., that are the underlying hardware infrastructure for VCE 100.

The physical and/or virtual machines may include a variety of operating systems and applications (e.g., operating system, word processing, etc.). The physical and/or virtual machines may have the same installed applications or may have different installed applications or software. The installed software may be one or more software applications from one or more vendors.

Each virtual machine may include a guest operating system and a guest file system. Moreover, the virtual machines may be logically grouped. That is, a subset of virtual machines may be grouped together in a container (e.g., VMware vApp™). For example, three different virtual machines may be implemented for a particular workload. As such, the three different virtual machines are logically grouped together to facilitate in supporting the workload. The virtual machines in the logical group may execute instructions alone and/or in combination (e.g., distributed) with one another. Also, the container of virtual machines and/or individual virtual machines may be controlled by a virtual management system. The virtualization infrastructure may also include a plurality of virtual datacenters. In general, a virtual datacenter is an abstract pool of resources (e.g., memory, CPU, storage). It is understood that a virtual data center is implemented on one or some combination of physical machines.

In various embodiments, computing system 110 may be a cloud environment, built upon a virtualized environment 120. Computing system 110 may be located in an Internet connected datacenter or a private cloud computing center coupled with one or more public and/or private networks. Computing system 110, in one embodiment, typically couples with a virtual or physical entity in a computing environment through a network connection which may be a public network connection, private network connection, or some combination thereof. For example, a user may couple via an Internet connection with computing system 110 by accessing a web page or application presented by computing system 110 at a virtual or physical entity.

As will be described in further detail herein, the virtual machines are hosted by a host computing system. A host includes virtualization software that is installed on top of the hardware platform and supports a virtual machine execution space within which one or more virtual machines may be concurrently instantiated and executed.

In some embodiments, the virtualization software may be a hypervisor (e.g., a VMware ESX™ hypervisor, a VMware ESXi™ hypervisor, etc.) For example, if hypervisor is a VMware ESX™ hypervisor, then virtual functionality of the host is considered a VMware ESX™ server.

Additionally, a hypervisor or virtual machine monitor (VMM) is a piece of computer software, firmware or hardware that creates and runs virtual machines. A computer on which a hypervisor is running one or more virtual machines is defined as a host machine. Each virtual machine is called a guest machine. The hypervisor presents the guest operating systems with a virtual operating platform and manages the execution of the guest operating systems. Additional details regarding embodiments of structure and functionality of a host computer system are provided with respect to FIG. 3.

During use, the virtual machines perform various workloads. For example, the virtual machines perform the workloads based on executing various applications. The virtual machines can perform various workloads separately and/or in combination with one another.

Figure 2:
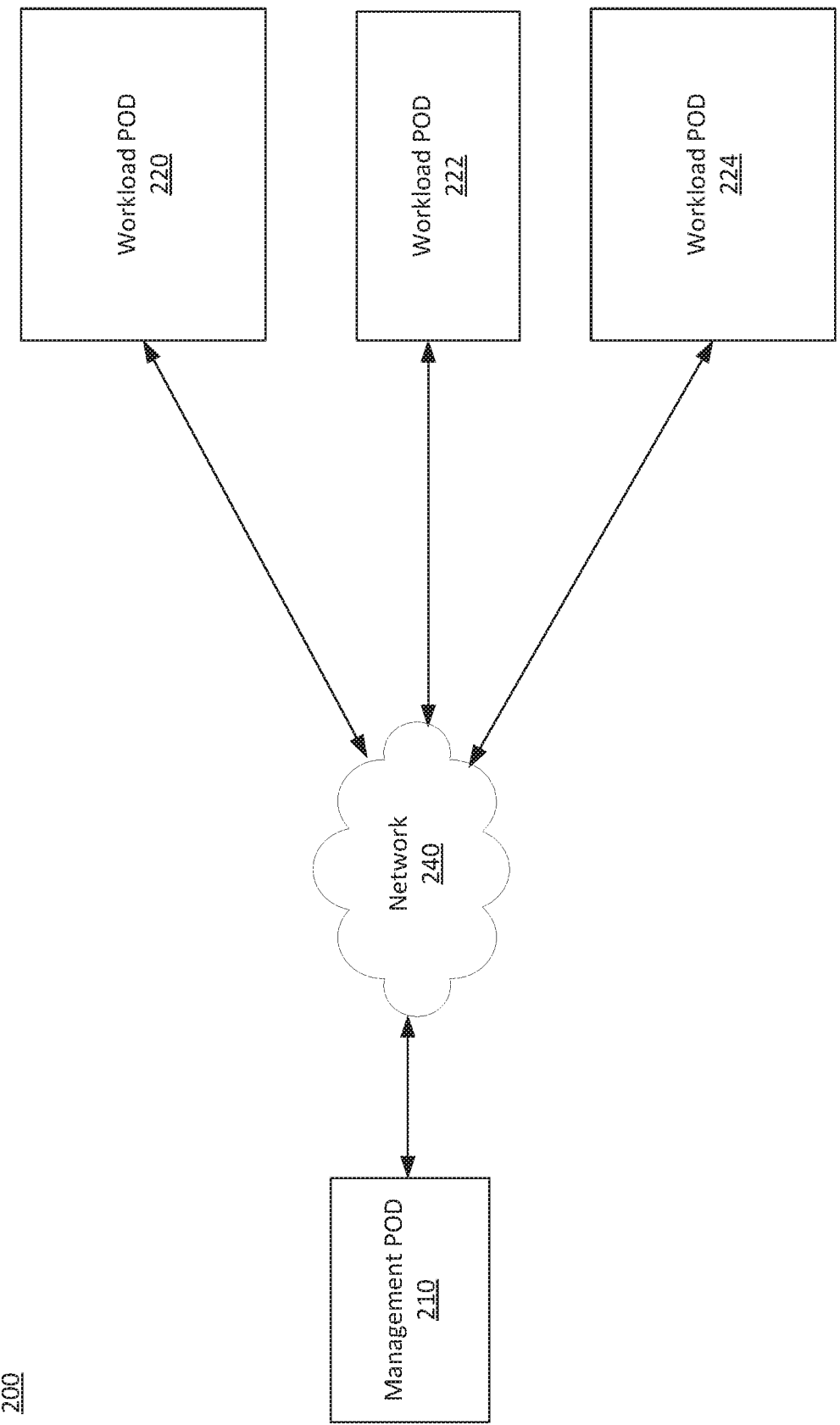
FIG. 2 depicts an example virtualization infrastructure upon which embodiments of the present invention can be implemented.

FIG. 2 shows an example virtualization infrastructure 200 upon which embodiments of the present invention can be implemented. Virtualization infrastructure 200 may be used, for example, to provide hardware virtualization enterprise services. Virtualization infrastructure 200 includes various network components working in tandem to provide virtualization. As illustrated, virtualization infrastructure 200 includes management Point of Delivery (POD) 210 and workload PODs 220, 222 and 224 communicatively coupled over network 240. It should be appreciated that virtualization infrastructure 200 may include any number of management PODs and workload PODs, and that the number of components shown in FIG. 2 is for illustrative purposes only. Moreover, it should be appreciated that virtualization infrastructure 200 may include other components, and is not intended to be limited to the illustrated embodiment.

In various embodiments, management POD 210 is a group of physical machines and/or virtual machines (VM) that host core cloud infrastructure components necessary for managing a software defined data center (SDDC) in a cloud computing environment that supports customer services. Cloud computing allows ubiquitous, convenient, on-demand network access to a shared pool of configurable computing resources. A cloud computing customer can request allocations of such resources to support services required by those customers. For example, when a customer requests to run one or more services in the cloud computing environment, one or more workload domains may be created based on resources in the shared pool of configurable computing resources. Examples disclosed herein enable customers to define different domain types, security, capacity, availability, and performance requirements for establishing workload domains in server rack deployments without requiring the users to have in-depth knowledge of server rack hardware and configurations.

In various embodiments, management POD 210 includes multiple software applications running on one or more VMs on top of the virtualization infrastructure 200. In one embodiment, management POD 210 includes an SDDC manager that includes applications operating within management POD 210 which is an SDDC instance with storage, compute and networking components. In addition, management POD 210 can include components supporting authentication, log aggregation and analysis, monitoring, automated performance management, cloud planning and capacity optimization. Management POD 210 enables creation and deletion of one or more workload PODs (e.g., workload PODs 220, 222 and 224). Each workload POD 220, 222 and 224 includes an SDDC instance with its own storage, compute and networking components. SDDC Manager running as part of the Management POD manages the lifecycle of the SDDC components running inside the Workload PODs. In various embodiments, workload PODs 220, 222, and 224 are groups of physical machines and/or virtual machines (VM) that provide workload managing a SDDC in a cloud computing environment that supports customer services.

Components of virtualization infrastructure 200 are communicatively coupled via network 240. It should be appreciated that network 240 may be any type of communication network, such as, and without limitation, a local intranet, an extranet, and the Internet. In some embodiments, components of virtualization infrastructure 200 are communicatively coupled to network 240 through VMs located within the components. In accordance with the described embodiments, network 240 provides packet-based communication using the Internet Protocol (IP).

In accordance with various embodiments, management POD 210 is managing virtualization infrastructure 200 across workload PODs 220, 222, and 224. Accordingly, management POD 210 is operated using up-to-date stable supported software versions. This ensures that management POD 210 always has latest features, capabilities and security patches. Workload PODs 220, 222, and 224 can run at different supported software versions, which can be older than the latest version operating on management POD 210. However, since the management of these components is residing inside management POD 210, the software versions of workload PODs 220, 222, and 224 are required to be compatible with the management POD 210 software versions.

Embodiments described herein provide for lifecycle management of a virtualization infrastructure that:
Keeps management POD applications up-to-date;
Allows workload PODs 220, 222, and 224, to be running older supported versions of the virtualization infrastructure;
Detect when upgrades might introduce version incompatibilities between management POD 210 and workload PODs 220, 222, and 224; and
Maintain version compatibility between management POD 210 and workload PODs 220, 222, and 224.

Hence, the embodiments of the present invention greatly extend beyond conventional methods of managing an upgrade of a virtualization infrastructure component. Moreover, embodiments of the present invention amount to significantly more than merely using a computer to perform anomaly detection of time series data. Instead, embodiments of the present invention specifically recite a novel process, rooted in computer technology, for maintaining compatibility between components of a virtualization infrastructure using a directed acyclic graph of available upgrade paths to overcome a problem specifically arising in the realm of maintaining compatibility of virtualization infrastructure components in computer systems.

Example Host Computer System

Figure 3:
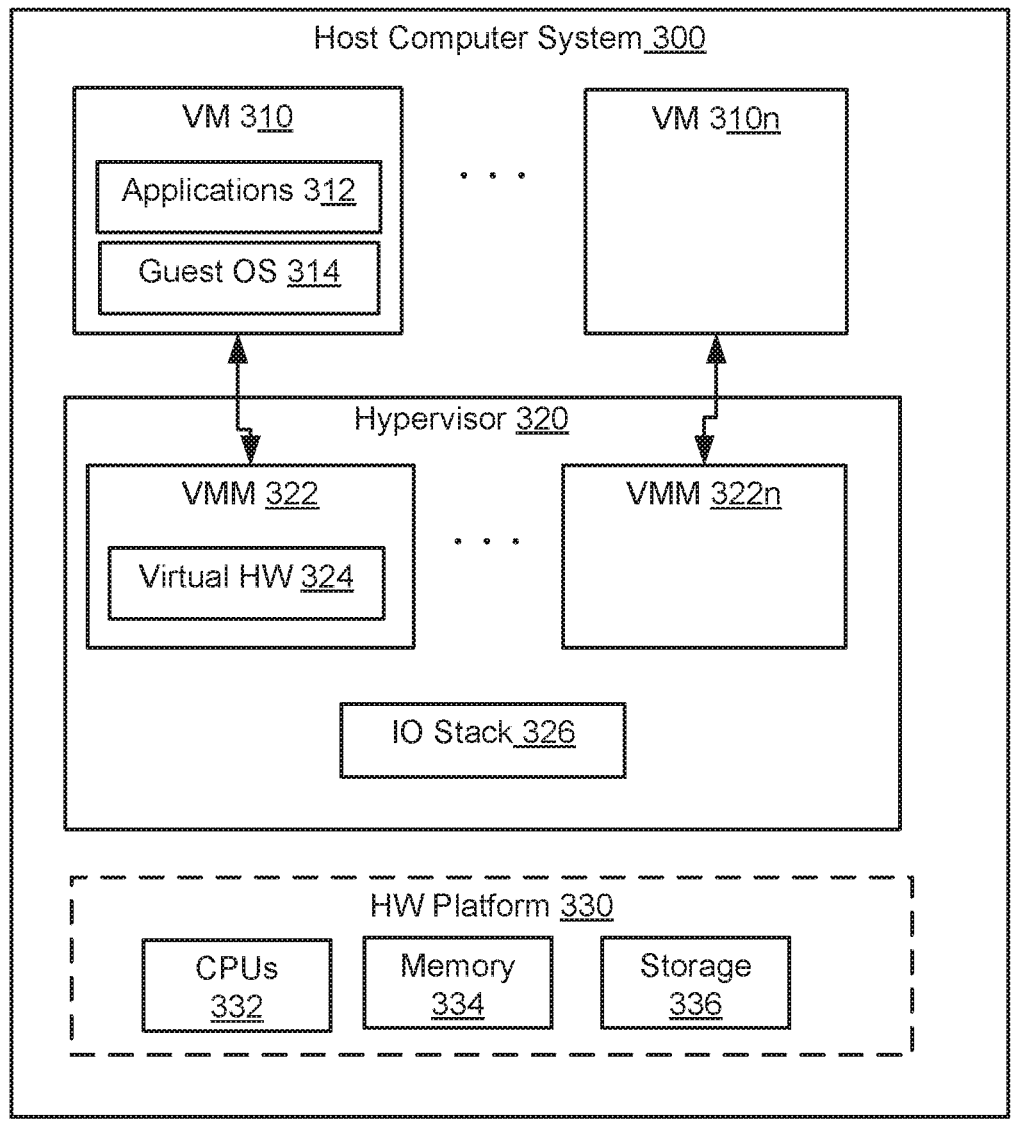
FIG. 3 depicts a block diagram of a host computing system, according to various embodiments.

FIG. 3 is a schematic diagram that illustrates a virtualized computer system that is configured to carry out one or more embodiments of the present invention. The virtualized computer system is implemented in a host computer system 300 including hardware platform 330. In one embodiment, host computer system 300 is constructed on a conventional, typically server-class, hardware platform.

Hardware platform 330 includes one or more central processing units (CPUs) 332, system memory 334, and storage 336. Hardware platform 330 may also include one or more network interface controllers (NICs) that connect host computer system 300 to a network, and one or more host bus adapters (HBAs) that connect host computer system 300 to a persistent storage unit.

Hypervisor 320 is installed on top of hardware platform 330 and supports a virtual machine execution space within which one or more virtual machines (VMs) may be concurrently instantiated and executed. Each virtual machine implements a virtual hardware platform that supports the installation of a guest operating system (OS) which is capable of executing applications. For example, virtual hardware 324 for virtual machine 310 supports the installation of guest OS 314 which is capable of executing applications 312 within virtual machine 310.

Guest OS 314 may be any of the well-known commodity operating systems, and includes a native file system layer, for example, either an NTFS or an ext3FS type file system layer. Example operating systems include, without limitation, Windows operating systems (e.g., Windows 7, Windows 8, Windows 10, or Windows Server 2012 R2), UNIX operating systems (e.g., Mac OS X server), and Linux operating systems. Moreover, it should be appreciated that operating systems are updated over time to different versions of the operating system (e.g., to provide improved functionality and/or to address security concerns). In accordance with various embodiments, operating system versions can refer to a particular release of an operating system and/or a particular build of an operating system. For example, a security patch applied to an operating system may refer to a new version of the operating system.

IOs issued by guest OS 314 through the native file system layer appear to guest OS 314 as being routed to one or more virtual disks provisioned for virtual machine 310 for final execution, but such IOs are, in reality, reprocessed by IO stack 326 of hypervisor 320 and the reprocessed IOs are issued, for example, through an HBA to a storage system.

Virtual machine monitor (VMM) 322 and 322$n$ may be considered separate virtualization components between the virtual machines and hypervisor 320 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. It should also be recognized that the techniques described herein are also applicable to hosted virtualized computer systems. Furthermore, although benefits that are achieved may be different, the techniques described herein may be applied to certain non-virtualized computer systems.

Example Virtual Environment

Figure 4:
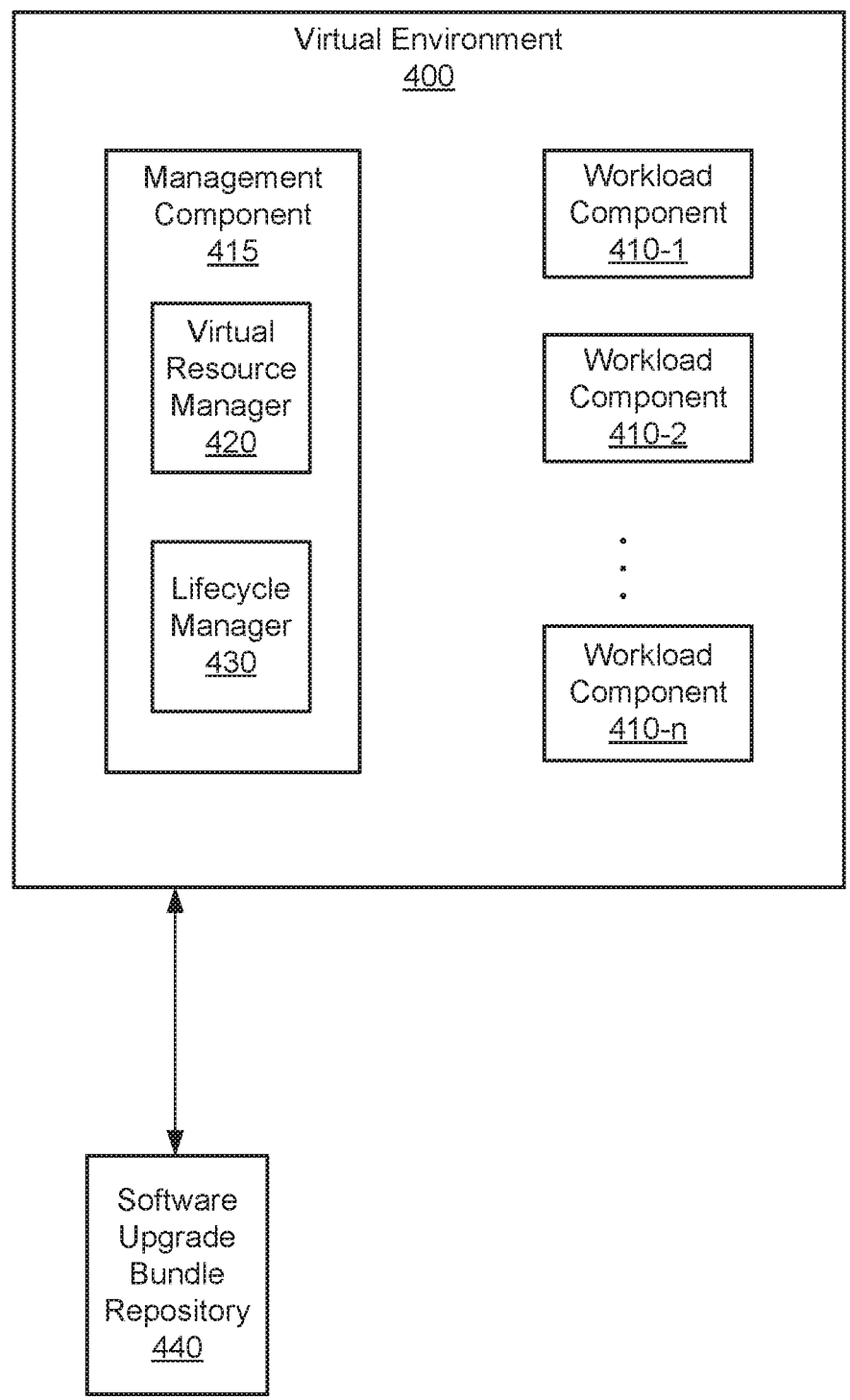
FIG. 4 depicts an example virtual environment, in accordance with an embodiment.

FIG. 4 illustrates an example virtual environment 400 (e.g., a cloud environment) in accordance with an embodiment. Virtual environment 400 may include one or more appliances. Virtual environment 400, in one embodiment, includes a number of workload components 410 (e.g., workload PODs) that includes workload components 410-1 through 410-$n$. Workload components 410-1 through 410-$n$ are communicatively coupled and act as a platform for managing the virtualization infrastructure and deploying virtual machines. VMware Cloud Foundation (VCF) is an example virtual environment 400.

Virtual environment 400 also includes management component 415 (e.g., a management POD) that includes virtual resource manager 420 and lifecycle manager 430. It should be appreciated that management component 415 may be implemented in a computing device, either virtual or physical, within virtual environment 400, and is communicatively coupled to workload components 410-1 through 410-n. Management component 415 may be implemented within one or more of workload components 410-1 through 410-n.

In various embodiments, virtual resource manager 420 is for managing allocation of resources (e.g., hosts) of workload components 410-1 through 410-n. For example, virtual resource manager 420 operates to make resources of workload components 410-1 through 410-n (e.g., storage hardware, computing hardware, and networking hardware) work together to achieve installation/operation and optimizing the resources for improved performance within virtual environment 400. Virtual resource manager 420 translates application requirements to physical infrastructure requirements. In accordance with various described embodiments, workload domains are mapped to a management cluster deployment (e.g., a vSphere cluster of VMware, Inc.) in a deployment (e.g., a rack deployment).

As utilized herein, a workload domain is an abstraction that can be applied to a number of different types of compute workloads. This allows the administrator to deploy capacity for specific workload types using a policy-driven approach on top of physical resources. In various embodiments, a workload domain has a set of policies that are configurable by the user during the deployment process. For example, a workload domain can be configured according to capacity required (e.g., host count and storage requirements), availability required, performance required, and networks required.

In some embodiments, a workload domain is a grouping of hosts of workload components 410-1 through 410-n. It should be appreciated that a workload domain can include any number of hosts, and that hosts of a workload domain con be distributed across any number of resources.

Virtual resource manager 420 enables the ability for streamlined and automated data center operations and the delivery of service offerings, such as virtual infrastructure (VI) and virtual desktop infrastructure (VDI) environments, based on a SDDC or cloud-based architecture. In some embodiments, an instance of virtual resource manager 420 is deployed on each workload component 410-1 through 410-n as part of a managed cluster of services.

Lifecycle manager 430 enables automated updating of components of virtual environment 400. In some embodiments, lifecycle manager 430 is communicatively coupled to a software repository for accessing software updates. For example, lifecycle manager 430 receives notification of update availability for a component of virtual environment 400, downloads the update bundle, selects update targets, schedules the update, and applies the update to the target according to the schedule.

In some embodiments, virtual environment is communicatively coupled to a software upgrade bundle repository 440. Software upgrade bundle repository 440 is a repository of available software upgrade bundles. It should be appreciated that software upgrade bundle repository 440 can be remote to virtual environment 400, local to virtual environment 400, or a combination thereof. For example, management component 415 can retrieve a software upgrade bundle from software upgrade bundle repository 440 for applying to a host.

Example Population of a Directed Acyclic Graph

Figure 5:
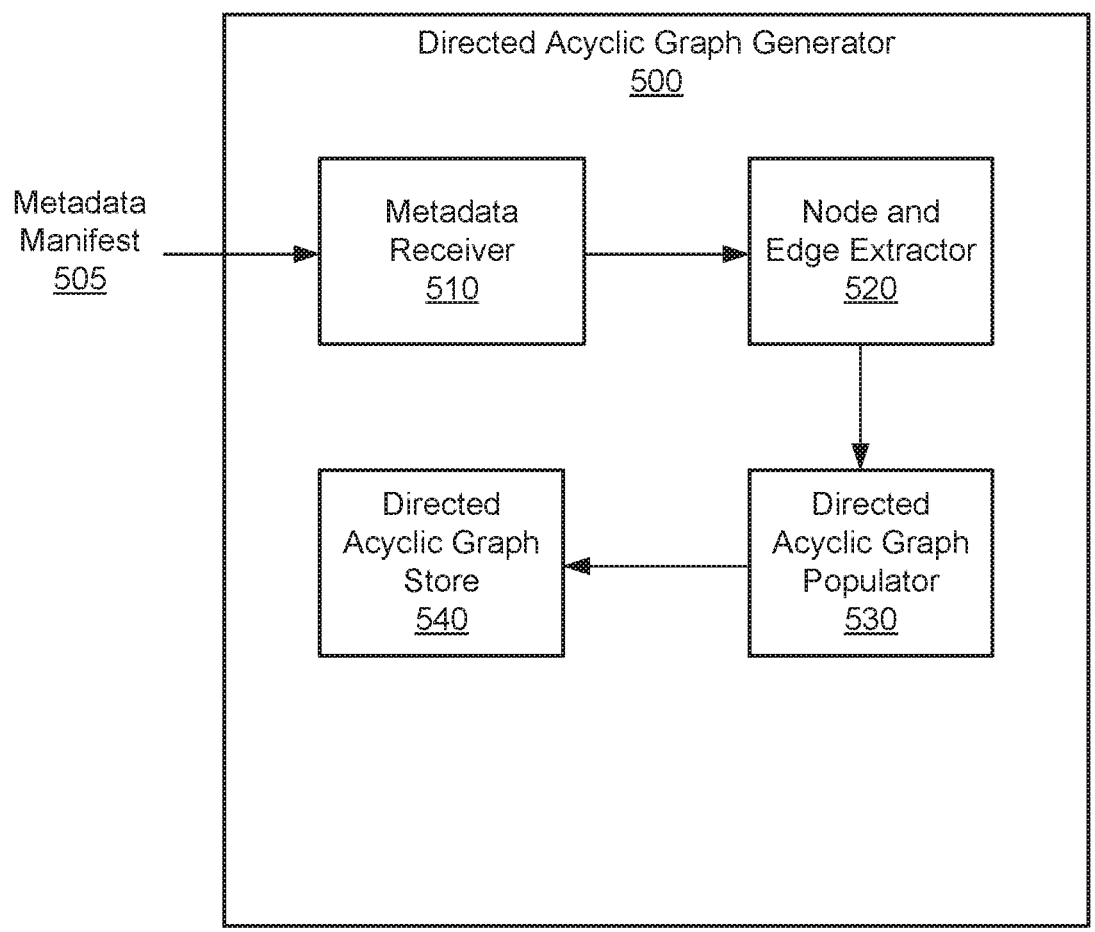
FIG. 5 depicts a block diagram illustrating an example directed acyclic graph generator, in accordance with an embodiment.

FIG. 5 depicts a block diagram illustrating an example directed acyclic graph generator 500, in accordance with an embodiment. In accordance with various embodiments, directed acyclic graph generator 500 includes metadata receiver 510, node and edge extractor 520, directed acyclic graph populator 530, and directed acyclic graph store 540. It should be appreciated that receiver 510, node and edge extractor 520, directed acyclic graph populator 530, and directed acyclic graph store 540 can be under the control of a single component of a virtualization infrastructure (e.g., management component 415) or can be distributed over multiple components (e.g., multiple management components 415 and/or multiple workload components 410). In some embodiments, some or all of metadata receiver 510, node and edge extractor 520, directed acyclic graph populator 530, and directed acyclic graph store 540 may be comprised within a lifecycle manager (e.g., lifecycle manager 430).

In the example shown in FIG. 5, a metadata manifest 505 is received. A metadata manifest 505 is associated with a corresponding software upgrade bundle (e.g., upgrade bits or upgrade applications). In some embodiments, metadata manifest 505 is packaged within the corresponding software upgrade bundle. In such embodiments, metadata receiver 510 may be configured to extract metadata manifest 505 from the corresponding software upgrade bundle. In other embodiments, metadata manifest 505 is received separately from the corresponding software upgrade bundle.

Metadata manifest 505 includes the information required to validate and apply the contents of the corresponding software upgrade bundle. Metadata manifest 505 also specifies the source version and the target version for the component being upgraded. In some embodiments, there is a unique software upgrade bundle for a given pair of source version and target version.

The following is an example metadata manifest for a software upgrade bundle that is for upgrading a component (e.g., a workload component or workload POD) from version 2 (V2) to version 3 (V3):

```
{
"bundleId": "B4",
"bundleType": "VMWARE_SOFTWARE",
"description": "This bundle upgrades the VCenter V2 to V3",
"bundleVersion": {
  "major": 0,
  "minor": 0,
  "patch": 5,
  "build": "SomeBuild"
},
"manifestVersion": 6,
"bundleVendor": "VMware",
"bundleSize": 1206980,
"details": [
  "Some Detailed Reason"
],
"bundleElements": [
  {
    "id": "319a7254-67d6-4ba3-a963-7b94acf08c27",
    "bundleSoftwareType": "VCENTER",
    "component": "VCenter",
    "bundleElementVendor": "VMware",
    "bundleElementVersion": "V2",
    "bundleElementPreviousVersion": "V3",
    "checksum": "ADFAFDSFSADWR345345345",
    "file": "vcenter-5.6.iso",
    "releaseDate": 828429
  }
],
"bundleDowntimeRequired": false,
"bundleChecksum": "6F9F93E1B1BBDD8E1580C087914CB8BE",
"source": "VMware",
"releaseDate": "03-10-2015",
```

-continued

```
"tarFile": "vcenter.tar",
"creationTime": 1498694544809,
"downloadStatus": "PENDING",
"applicableToOlderVersion": false,
"complianceCheckRequired": true,
"minComplianceLevel": [
  {
    "bundleSoftwareType": "VCENTER",
    "softwareVersion": "V2"
  },
  {
    "bundleSoftwareType": "ESX_HOST",
    "softwareVersion": "V2"
  },
  {
    "bundleSoftwareType": "NSX_MANAGER",
    "softwareVersion": "V2"
  }
]
}
```

Node and edge extractor 520 receives metadata manifest 505 and extracts nodes and an edge connecting the nodes from metadata manifest 505. The source version and the target version of the software upgrade bundle are the nodes and the bundle identifier is the directed edge connecting the nodes. The edge is directed because the upgrade is from a source version to a target version. The nodes and edge are received at directed acyclic graph populator 530. There are no downgrade bundles and hence there can be no cycles in the graph (e.g., acyclic). In some embodiments, the entire graph model is built using only the metadata manifests for currently available upgrade bundles.

Figure 6A:
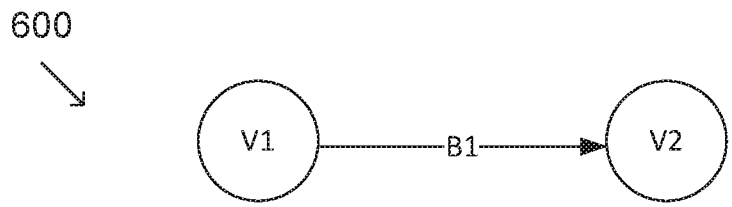
FIGS. 6A through 6C depict example directed acyclic graphs, according to various embodiments
Figure 6B:
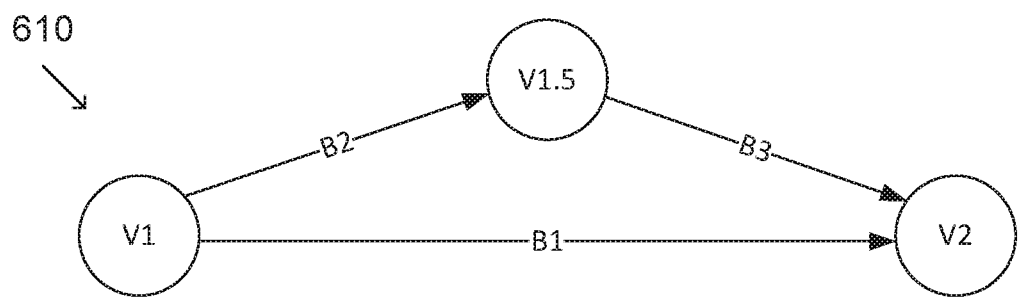
Figure 6C:
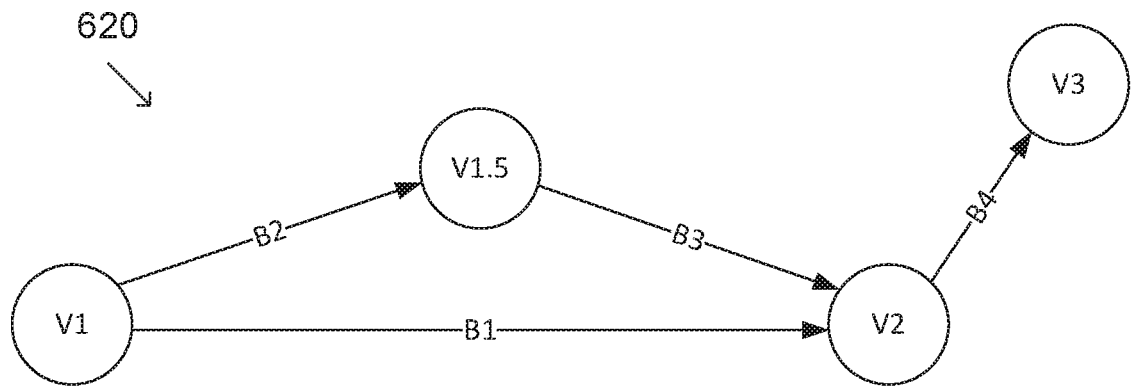

With reference to FIGS. 6A through 6C, examples of directed acyclic graphs are shown, according to various embodiments. At FIG. 6A, directed acyclic graph 600 is illustrated. Directed acyclic graph 600 includes nodes V1 and V2, connected by directed edge B1. Directed edge B1 indicates that software upgrade bundle B1 is for upgrading a virtualization component from version V1 to version V2.

At FIG. 6B, directed acyclic graph 610 is illustrated. Directed acyclic graph 610 illustrates a later instance of directed acyclic graph 600 where node V1.5 and directed edges B2 and B3 have been added. Node V1.5 and directed edges B2 and B3 were added in response to receiving a metadata manifest for two additional software upgrade bundles B2 and B3, where software upgrade bundle B2 is for upgrading a virtualization component from V1 to V1.5 and software upgrade bundle B3 is for upgrading a virtualization component from V1.5 to V2.

For example, given this directed acyclic graph 610, the management component can compute various possible upgrades on a workload component based on the currently running version in the workload component. For example, if the currently running version in a workload component is V1, either bundle B1 or bundle B2 can be used for the upgrade based on the desired target version.

At FIG. 6C, directed acyclic graph 620 is illustrated. Directed acyclic graph 620 illustrates a later instance of directed acyclic graph 610 where node V3 and directed edge B4 has been added. Node V3 and directed edge B4 was added in response to receiving a metadata manifest for software upgrade bundle B4, where software upgrade bundle B4 is for upgrading a virtualization component from V2 to V3.

With reference to FIG. 5, directed acyclic graph store 540 is configured to receive and maintain the directed acyclic graph. In one embodiment, directed acyclic graph store 540 is maintained at the management component, where a different directed acyclic graph is maintained for each workload component. In another embodiment, the directed acyclic graph store 540 is maintained at the particular workload component and the directed acyclic graph is accessible to the management component.

In some embodiments, a metadata manifest can also specify a minimum supported version for the virtualization component. For example, a new bundle B4 is released and the management component needs to be upgraded to the target version V3 which includes important features and security fixes. V3 is only compatible with versions V2 and above. The management component can then consult the directed acyclic graph for the virtualization components and figure out which workload components might become non-compliant if the management component is upgraded to V3.

In some embodiment, the management component maintains a sliding compatibility window of compatible versions of workload components for a given management component version. FIGS. 7A and 7B illustrate examples of compatibility windows for a management component, in accordance with embodiments.

For example, with reference to FIG. 7A, compatibility window 700 is illustrated. Compatibility window 700 indicates that the management component is version V2, and that compatible versions for workload components include versions V1, V1.5, and V2. It should be appreciated that the management component is running the most current version (e.g., highest) within compatibility window 700, as workload components are not able to run higher versions than the management component. As illustrated in FIG. 7A, when a management component version V2, compatibility window 700 includes V1, V1.5 and V2.

With reference to FIG. 7B, compatibility window 710 is illustrated. Compatibility window 710 indicates that the management component is version V3 (from previous V2), and that compatible versions for workload components include versions V2 and V3. In this embodiment, any workload component that is not version V2 or V3 is required to upgrade to V2 or V3 to maintain compatibility with the management component.

In some embodiments, the management component can also compute how to upgrade the workload components in the fewest number of steps to maintain compatibility. For example, with reference to FIG. 6B, for a workload component running version V1, there are two options to upgrade to version V2.

V1→V2

V1→V1.5→V2

Using shortest path calculations on the directed acyclic graph, the management component computes that upgrading the workload component from V1 to V2 using bundle B1 will take the fewest number of steps and maintain version compatibility.

In some embodiments, these calculations are performed using only the metadata manifests. In general, the metadata manifests are small text files in comparison to the corresponding software upgrade bundle. Thus, the management component/workload component avoids downloading potentially large size software upgrade bundles unless they are actually being used in an upgrade.

In some embodiments, graph operations allow the addition or removal of a bundle dependency. This makes the directed acyclic graph very lightweight and easily maintained in-memory.

Hence, the embodiments of the present invention greatly extend beyond conventional methods of managing an upgrade of a virtualization infrastructure component. Moreover, embodiments of the present invention amount to significantly more than merely using a computer to perform anomaly detection of time series data. Instead, embodiments of the present invention specifically recite a novel process, rooted in computer technology, for maintaining compatibility between components of a virtualization infrastructure using a directed acyclic graph of available upgrade paths to overcome a problem specifically arising in the realm of maintaining compatibility of virtualization infrastructure components in computer systems.

Example Methods of Operation

Figure 8:
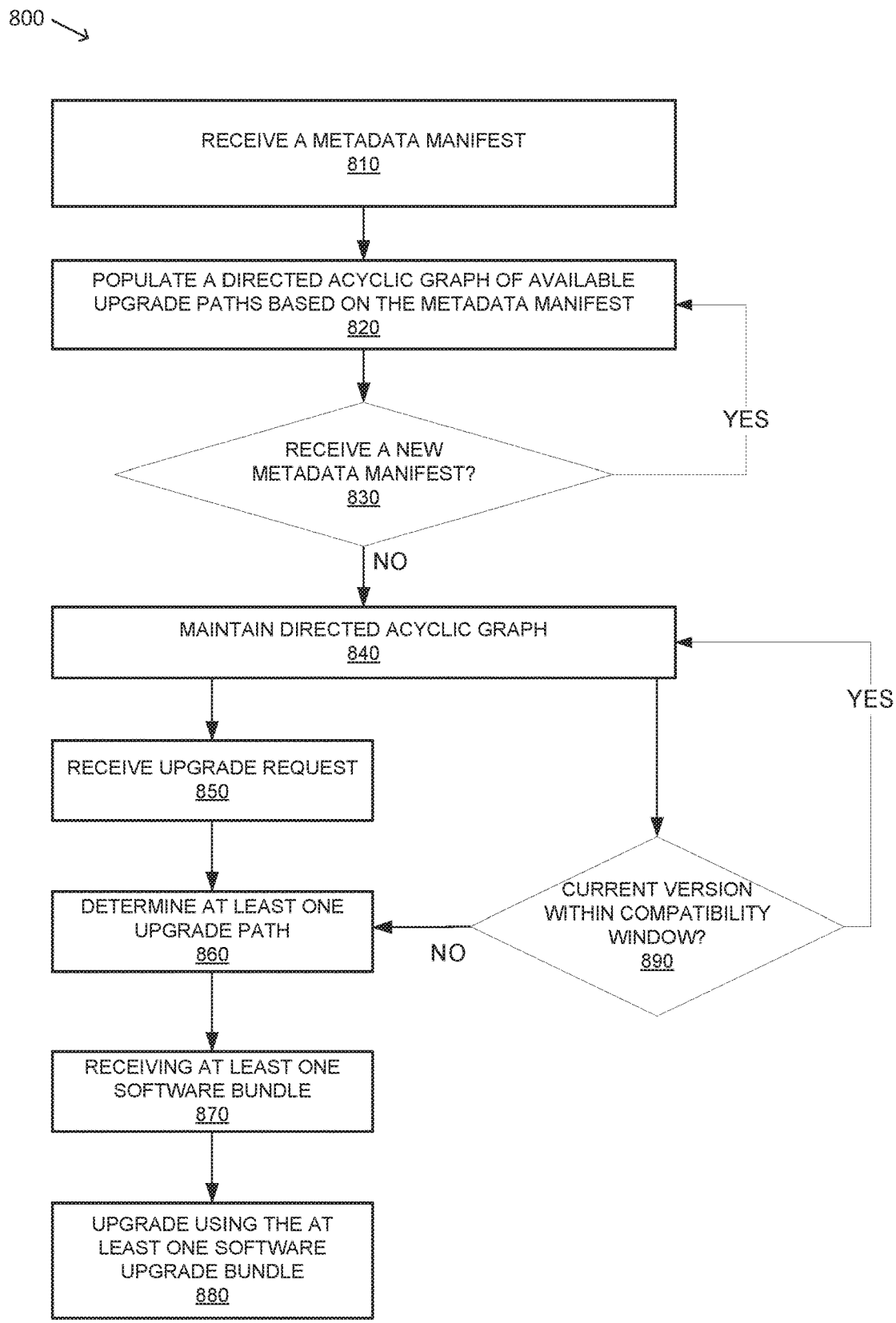
FIG. 8 depicts a flow diagram of a method for managing an upgrade of a virtualization infrastructure component, according to various embodiments.
Figure 9:
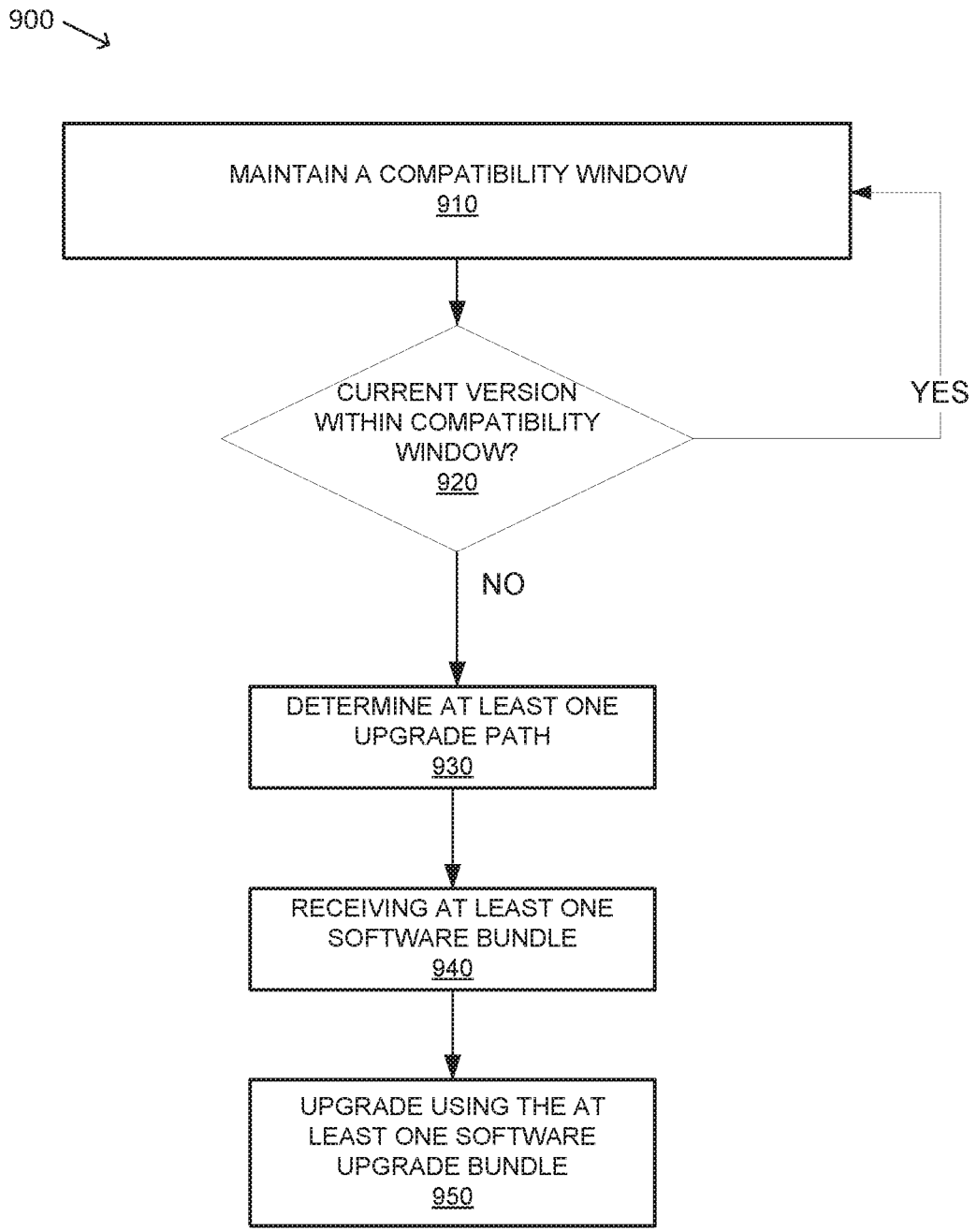
FIG. 9 depicts a flow diagram of a method for maintaining compatibility between virtualization infrastructure components, according to various embodiments.

The following discussion sets forth in detail the operation of some example methods of operation of embodiments. With reference to FIGS. 8 and 9, flow diagrams 800 and 900 illustrate example procedures used by various embodiments. Flow diagrams 800 and 900 include some procedures that, in various embodiments, are carried out by a processor under the control of computer-readable and computer-executable instructions. In this fashion, procedures described herein and in conjunction with flow diagrams 800 and 900 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g., computer system 110 and/or virtualized environment 120). The computer-readable and computer-executable instructions, which reside on tangible computer readable storage media, are used to control or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in flow diagrams 800 and 900 such procedures are examples. That is, embodiments are well suited to performing various other procedures or variations of the procedures recited in flow diagrams 800 and 900. Likewise, in some embodiments, the procedures in flow diagrams 800 and 900 may be performed in an order different than presented and/or not all of the procedures described in one or more of these flow diagrams may be performed. It is further appreciated that procedures described in flow diagrams 800 and 900 may be implemented in hardware, or a combination of hardware with firmware and/or software.

FIG. 8 depicts a flow diagram 800 of a method for managing an upgrade of a virtualization infrastructure component, according to various embodiments. At procedure 810 of flow diagram 800, a metadata manifest corresponding to a software upgrade bundle is received. In one embodiment, a plurality of metadata manifests corresponding to a plurality of software upgrade bundles is received. A software upgrade bundle is for upgrading a virtualization infrastructure component from a source version to a target version. A metadata manifest includes a listing of applications included within a corresponding software upgrade bundle and installation instructions for the applications included within the corresponding software upgrade bundle for upgrading the virtualization infrastructure component from a particular source version to a particular target version.

At procedure 820, a directed acyclic graph of available upgrade paths for the virtualization infrastructure component is populated based on the metadata manifest. Nodes of the directed acyclic graph identify the source versions and the target versions and edges of the directed acyclic graph identify the software upgrade bundle for upgrading the virtualization infrastructure component from the particular source version to the particular target version identified by the corresponding software upgrade bundle.

At procedure 830, it is determined whether a new metadata manifest is received. If a new metadata manifest is received, flow diagram 800 proceeds to procedure 820, the operation of which is described above. In this manner, as new metadata manifest corresponding to new software upgrade bundles are received, the directed acyclic graph is update accordingly. If no new metadata manifest is received, flow diagram 800 proceeds to procedure 840.

At procedure 840, the directed acyclic graph is maintained. In one embodiment, the directed acyclic graph is maintained in memory of the management component. In one embodiment, the directed acyclic graph is maintained in memory of the workload component.

In one embodiment, at procedure 850, a request to upgrade the virtualization infrastructure component to a requested target version is received. At procedure 860, the directed acyclic graph is utilized to determine at least one upgrade path identifying at least one software upgrade bundle of the plurality of software upgrade bundles for upgrading the virtualization infrastructure component to the requested target version.

In one embodiment, at procedure 870, at least one software upgrade bundle of the plurality of software upgrade bundles corresponding to the selected upgrade path is received. In one embodiment, at procedure 880, the virtualization infrastructure component is upgraded to the requested target version using the at least one software upgrade bundle of a selected upgrade path. In one embodiment, the selected upgrade path is an upgrade path selected from a plurality of upgrade paths including a fewest amount of software upgrade bundles.

In one embodiment, at procedure 890, it is determined whether a current version of the virtualization infrastructure component is within a compatibility window maintained at a management virtualization infrastructure component. The compatibility window defines at least one version of the virtualization infrastructure component that is compatible with the management virtualization infrastructure component. It should be appreciated the procedure 890 can be initiated by the management component in response to a change in the compatibility window. If the current version of the virtualization infrastructure component is within the compatibility window, flow diagram 800 proceeds to procedure 840, the operation of which is described above. If the current version of the virtualization infrastructure component is not within the compatibility window, flow diagram 800 proceeds to procedure 860, the operation of which is described above.

FIG. 9 depicts a flow diagram 900 of a method for maintaining compatibility between virtualization infrastructure components, according to various embodiments. At procedure 910 of flow diagram 900, a compatibility window defining at least one version of a virtualization infrastructure component of a virtualization infrastructure that is compatible with a management virtualization infrastructure component of the virtualization infrastructure is maintained. In one embodiment, the compatibility window is maintained at the management virtualization infrastructure component At procedure 920, it is determined whether a current version of the virtualization infrastructure component is within the compatibility window. If the current version of the virtualization infrastructure component is within the compatibility window, flow diagram 900 proceeds to procedure 910, the operation of which is described above. If the current version of the virtualization infrastructure component is not within the compatibility window, flow diagram 900 proceeds to procedure 930.

At procedure 930, provided the current version of the virtualization infrastructure component is not within the compatibility window, a directed acyclic graph of available upgrade paths for the virtualization infrastructure component is utilized to determine at least one upgrade path identifying at least one software upgrade bundle for upgrading the virtualization infrastructure component to a version within the compatibility window. Edges of the directed acyclic graph identify a software upgrade bundle for upgrading the virtualization infrastructure component from a source version to a target version and nodes of the directed acyclic graph identify the source versions and the target versions.

In one embodiment, at procedure 940, at least one software upgrade bundle of the plurality of software upgrade bundles corresponding to the selected upgrade path is received. In one embodiment, at procedure 950, the virtualization infrastructure component is upgraded to the requested target version using the at least one software upgrade bundle of a selected upgrade path. In one embodiment, the selected upgrade path is an upgrade path selected from a plurality of upgrade paths including a fewest amount of software upgrade bundles.

It is noted that any of the procedures, stated above, regarding flow diagrams 800 and 900 may be implemented in hardware, or a combination of hardware with firmware and/or software. For example, any of the procedures are implemented by a processor(s) of a cloud environment and/or a computing environment.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims.

In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for managing an upgrade of a virtualization infrastructure component, the method comprising:

receiving a plurality of metadata manifests corresponding to a plurality of software upgrade bundles, each software upgrade bundle of the plurality of software upgrade bundles for upgrading a virtualization infrastructure component from a source version to a target version, each metadata manifest comprising a listing of applications comprised within a corresponding software upgrade bundle and installation instructions for the applications comprised within the corresponding software upgrade bundle for upgrading the virtualization infrastructure component from a particular source version to a particular target version;

populating a directed acyclic graph of available upgrade paths for the virtualization infrastructure component based on the plurality of metadata manifests, wherein nodes of the directed acyclic graph identify the source versions and the target versions and edges of the directed acyclic graph identify the software upgrade bundle for upgrading the virtualization infrastructure component from the particular source version to the particular target version identified by the corresponding software upgrade bundle;

maintaining the directed acyclic graph for the virtualization infrastructure component, wherein the directed acyclic graph is updatable in response to receiving a new metadata manifest corresponding to a new software upgrade bundle, such that the directed acyclic graph is accessible for a subsequently received request to upgrade the virtualization infrastructure component to a requested target version; and determining whether a current version of the virtualization infrastructure component is within a compatibility window maintained at a management virtualization infrastructure component, wherein the compatibility window defines at least one version of the virtualization infrastructure component that is compatible with the management virtualization infrastructure component; and provided the current version of the virtualization infrastructure component is not within the compatibility window, determining that virtualization infrastructure component requires an upgrade to the virtualization infrastructure component to maintain compatibility with the management virtualization infrastructure component.

2. The method of claim 1, further comprising:

receiving a new metadata manifest of the plurality of metadata manifests corresponding to a new software upgrade bundle of the plurality of software upgrade bundles, the new metadata manifest for upgrading the virtualization infrastructure component from a second particular source version to a second particular target version; and updating the directed acyclic graph of by updating the nodes according to the second particular source version of and the second particular target version and adding a new edge identifying the new software upgrade bundle for upgrading the virtualization infrastructure component from the second particular source version to the second particular target version.

3. The method of claim 1, further comprising:

receiving a request to upgrade the virtualization infrastructure component to a requested target version; and utilizing the directed acyclic graph, determining at least one upgrade path identifying at least one software upgrade bundle of the plurality of software upgrade bundles for upgrading the virtualization infrastructure component to a requested target version.

4. The method of claim 3, further comprising:

upgrading the virtualization infrastructure component to the requested target version using the at least one software upgrade bundle of a selected upgrade path.

5. The method of claim 4, wherein the selected upgrade path is an upgrade path selected from a plurality of upgrade paths comprising a fewest amount of software upgrade bundles.

6. The method of claim 4, further comprising:

receiving at least one software upgrade bundle of the plurality of software upgrade bundles corresponding to the selected upgrade path.

7. The method of claim 1, further comprising:

provided the current version of the virtualization infrastructure component is not within the compatibility window, utilizing the directed acyclic graph, determining at least one upgrade path identifying at least one software upgrade bundle of the plurality of software upgrade bundles for upgrading the virtualization infrastructure component to a version within the compatibility window; and upgrading the virtualization infrastructure component to the version within the compatibility window using the at least one software upgrade bundle of a selected upgrade path.

8. The method of claim 7, further comprising:

receiving at least one software upgrade bundle of the plurality of software upgrade bundles corresponding to the selected upgrade path.

9. The method of claim 1, further comprising:

receiving at least one software upgrade bundle of the plurality of software upgrade bundles.

10. A non-transitory computer readable storage medium having computer readable program code stored thereon for causing a computer system to perform a method for managing an upgrade of a virtualization infrastructure component, the method comprising:

receiving a plurality of metadata manifests corresponding to a plurality of software upgrade bundles, each software upgrade bundle of the plurality of software upgrade bundles for upgrading a virtualization infrastructure component from a source version to a target version, each metadata manifest comprising a listing of applications comprised within a corresponding software upgrade bundle and installation instructions for the applications comprised within the corresponding software upgrade bundle for upgrading the virtualization infrastructure component from a particular source version to a particular target version;

populating a directed acyclic graph of available upgrade paths for the virtualization infrastructure component based on the plurality of metadata manifests, wherein nodes of the directed acyclic graph identify the source versions and the target versions and edges of the directed acyclic graph identify the software upgrade bundle for upgrading the virtualization infrastructure component from the particular source version to the particular target version identified by the corresponding software upgrade bundle;

maintaining the directed acyclic graph for the virtualization infrastructure component, wherein the directed acyclic graph is updatable in response to receiving a new metadata manifest corresponding to a new software upgrade bundle, such that the directed acyclic graph is accessible for a subsequently received request to upgrade the virtualization infrastructure component to a requested target version;

determining whether a current version of the virtualization infrastructure component is within a compatibility window maintained at a management virtualization infrastructure component, wherein the compatibility window defines at least one version of the virtualization infrastructure component that is compatible with the management virtualization infrastructure component; and provided the current version of the virtualization infrastructure component is not within the compatibility window, determining that virtualization infrastructure component requires an upgrade to the virtualization infrastructure component to maintain compatibility with the management virtualization infrastructure component.

11. The non-transitory computer readable storage medium of claim 10, the method further comprising:

receiving a new metadata manifest of the plurality of metadata manifests corresponding to a new software upgrade bundle of the plurality of software upgrade bundles, the new metadata manifest for upgrading the virtualization infrastructure component from a second particular source version to a second particular target version; and updating the directed acyclic graph of by updating the nodes according to the second particular source version of and the second particular target version and adding a new edge identifying the new software upgrade bundle for upgrading the virtualization infrastructure component from the second particular source version to the second particular target version.

12. The non-transitory computer readable storage medium of claim 10, the method further comprising:
  receiving a request to upgrade the virtualization infrastructure component to a requested target version;
  utilizing the directed acyclic graph, determining at least one upgrade path identifying at least one software upgrade bundle of the plurality of software upgrade bundles for upgrading the virtualization infrastructure component to a requested target version; and
  upgrading the virtualization infrastructure component to the requested target version using the at least one software upgrade bundle of a selected upgrade path.

13. The non-transitory computer readable storage medium of claim 12, wherein the selected upgrade path is an upgrade path selected from a plurality of upgrade paths comprising a fewest amount of software upgrade bundles.

14. The non-transitory computer readable storage medium of claim 12, the method further comprising:
  receiving at least one software upgrade bundle of the plurality of software upgrade bundles corresponding to the selected upgrade path.

15. The non-transitory computer readable storage medium of claim 10, the method further comprising:
  provided the current version of the virtualization infrastructure component is not within the compatibility window, utilizing the directed acyclic graph, determining at least one upgrade path identifying at least one software upgrade bundle of the plurality of software upgrade bundles for upgrading the virtualization infrastructure component to a version within the compatibility window; and
  upgrading the virtualization infrastructure component to the version within the compatibility window using the at least one software upgrade bundle of a selected upgrade path.

16. The non-transitory computer readable storage medium of claim 15, the method further comprising:
  receiving at least one software upgrade bundle of the plurality of software upgrade bundles corresponding to the selected upgrade path.

17. A method for managing an upgrade of a virtualization infrastructure component, the method comprising:
  maintaining a compatibility window defining at least one version of a virtualization infrastructure component of a virtualization infrastructure that is compatible with a management virtualization infrastructure component of the virtualization infrastructure;
  maintaining a directed acyclic graph of available upgrade paths for the virtualization infrastructure component, wherein edges of the directed acyclic graph identify a software upgrade bundle for upgrading the virtualization infrastructure component from a source version to a target version and nodes of the directed acyclic graph identify the source versions and the target versions, wherein the directed acyclic graph is updatable in response to receiving a new metadata manifest corresponding to a new software upgrade bundle, such that the directed acyclic graph is accessible for utilization for a subsequently made determination to upgrade the virtualization infrastructure component to a requested target version;
  determining whether a current version of the virtualization infrastructure component is within the compatibility window;
  provided the current version of the virtualization infrastructure component is not within the compatibility window, determining that virtualization infrastructure component requires an upgrade to the virtualization infrastructure component to maintain compatibility with the management virtualization infrastructure component and utilizing the directed acyclic graph of available upgrade paths for the virtualization infrastructure component to determine at least one upgrade path identifying at least one software upgrade bundle for upgrading the virtualization infrastructure component to a version within the compatibility window; and
  upgrading the virtualization infrastructure component to the version within the compatibility window using the at least one software upgrade bundle of a selected upgrade path.

18. The method of claim 17, further comprising:
  receiving at least one software upgrade bundle corresponding to the selected upgrade path.

19. The method of claim 17, wherein the compatibility window is maintained at the management virtualization infrastructure component.

* * * * *